US010007113B2

(12) United States Patent
Wall

(10) Patent No.: US 10,007,113 B2
(45) Date of Patent: Jun. 26, 2018

(54) DISPLAY DEVICE FOR A MOTOR VEHICLE

(71) Applicant: AUDI AG, Ingolstadt (DE)

(72) Inventor: Christian Wall, Hitzhofen (DE)

(73) Assignee: AUDI AG, Ingolstadt (DE)

( * ) Notice: Subject to any disclaimer, the term of this patent is extended or adjusted under 35 U.S.C. 154(b) by 0 days. days.

(21) Appl. No.: 15/122,882

(22) PCT Filed: Apr. 30, 2015

(86) PCT No.: PCT/EP2015/000888
§ 371 (c)(1),
(2) Date: Aug. 31, 2016

(87) PCT Pub. No.: WO2015/180817
PCT Pub. Date: Dec. 3, 2015

(65) Prior Publication Data
US 2017/0075118 A1 Mar. 16, 2017

(30) Foreign Application Priority Data
May 30, 2014 (DE) ........................ 10 2014 008 201

(51) Int. Cl.
*G02B 27/14* (2006.01)
*G02B 27/01* (2006.01)
(Continued)

(52) U.S. Cl.
CPC ............ *G02B 27/0149* (2013.01); *B60R 1/00* (2013.01); *F03G 7/065* (2013.01); *G02B 7/008* (2013.01);
(Continued)

(58) Field of Classification Search
CPC .. G02B 27/0149; G02B 7/008; G02B 7/1821; G02B 27/01; G02B 27/0101; B60R 1/00; F03G 7/065
(Continued)

(56) References Cited

U.S. PATENT DOCUMENTS 6,698,905 B1 * 3/2004 Whitehead ................ B60R 1/04 359/604
2006/0050018 A1 * 3/2006 Hutzel .................. B60K 35/00 345/60

(Continued)

FOREIGN PATENT DOCUMENTS

CN 103135233 A 6/2013
DE 100 44 221 A1 4/2001

(Continued)

OTHER PUBLICATIONS

German Office Action for Application No. 10 2014 008 201.6 dated Jan. 26, 2015.

(Continued)

*Primary Examiner* — James Greece
(74) *Attorney, Agent, or Firm* — Staas & Halsey LLP

(57) ABSTRACT

In a motor vehicle, a display device has a display area displaying an image projected by an optical device by way of a reflection area as a virtual image. The optical device has at least one reflector and an actuator which moves the reflector. The actuator includes a shape memory material, which is designed to be deformed by a temperature-dependent phase transition and thereby move the reflector. By the provision of a thermal shape memory actuator that functions without an electric current, the optical path can be changed, so that overheating of internal temperature-sensitive components of the display device can be prevented in a way that is particularly inexpensive and efficient in terms of installation space and it is also possible to dispense with electronic sensing, evaluation and activation entirely.

15 Claims, 1 Drawing Sheet

16
20
14a
10
18
22
14
14b
12

(51) Int. Cl.
*F03G 7/06* (2006.01)
*B60R 1/00* (2006.01)
*G02B 7/00* (2006.01)
*G02B 7/182* (2006.01)

(52) U.S. Cl.
CPC ........... *G02B 7/1821* (2013.01); *G02B 27/01* (2013.01); *G02B 27/0101* (2013.01); *B60R 2300/205* (2013.01); *G02B 2027/0154* (2013.01)

(58) Field of Classification Search
USPC .......................................................... 359/630
See application file for complete search history.

(56) References Cited

U.S. PATENT DOCUMENTS

2006/0164230 A1* 7/2006 DeWind ................. B60K 35/00 340/461
2006/0291066 A1 12/2006 Shiobara et al.
2007/0247420 A1* 10/2007 Strohband ............. H01H 13/84 345/156
2016/0004032 A1* 1/2016 Wiklof ..................... G02B 7/10 359/846

FOREIGN PATENT DOCUMENTS

DE 102004002157 B3 8/2005
DE 112009000745 T5 10/2011
DE 102011105689 A1 12/2012
DE 102014008201.6 5/2014
JP 2001-97073 A 4/2001
JP 2002-283916 10/2002
JP 2006-11168 1/2006
WO PCT/EP2015/000888 4/2015

OTHER PUBLICATIONS

International Search Report for PCT/EP2015/000888 dated Jul. 14, 2015.
Chinese Office Action for Application No. 201580011340.7 dated Mar. 23, 2017.
English Translation of International Preliminary Examination Report on Patentability by WIPO for PCT/EP2015/000888 dated Dec. 1, 2016.

* cited by examiner 16
10
18
22
14a
20
12
14b
14

16
10
18
22
14a
12
20
14b
14

DISPLAY DEVICE FOR A MOTOR VEHICLE

CROSS REFERENCE TO RELATED APPLICATIONS

This application is the U.S. national stage of International Application No. PCT/EP2015/000888, filed Apr. 30, 2015 and claims the benefit thereof. The International Application claims the benefit of German Application No. 102014008201.6 filed on May 30, 2014, both applications are incorporated by reference herein in their entirety.

BACKGROUND

Described below is a display device for a motor vehicle, the display device having a display area for displaying an image and an optical device, which is designed to project an image displayed on the display area by way of a reflection area as a virtual image. The optical device has in this case at least one reflector and an actuator, which is designed for moving the reflector. Also described below is a motor vehicle with such a display device.

The related art includes display devices, in particular HUDs (Head-Up Displays), which usually have a display on which an image can be displayed and is projected via an optical unit as a virtual image by reflection on the windshield of a motor vehicle. The light of the displayed image that is cast or projected by the optical unit onto the windshield is partly reflected by the windshield, whereby the virtual image is produced. On account of their function, such display devices are located in front of the driver in the traveling direction and consequently in the area of direct solar irradiation. The optical elements of the display device, in particular reflectors or mirrors, have in this case a magnifying function. As a result, under unfavorable conditions solar irradiation can cause extreme heating of the equipment and the focused solar radiation can make the display of the display device melt.

The related art includes HUDs which have an adjustable mirror that can be adjusted in accordance with predetermined criteria in order to prevent sunlight that is radiated through the windshield from being incident on the display of the HUD. Such devices at the same time have sensor systems, in order for example to sense an illuminance or a position of the sun, as described in DE 10 2011 105 689 A1, or a temperature in the vicinity of the display, as described in DE 100 44 221 A1. Such configurations consequently require numerous additional components, such as sensors and actuators, such as for example electric motors, control devices for activating the actuators, and are consequently relatively expensive and also take up a lot of installation space.

SUMMARY

Described below is a display device for a motor vehicle and a motor vehicle with such a display device by which more effective protection of sensitive components of the display device from solar irradiation can be provided.

The display device has a display area for displaying an image and an optical device which is designed to project an image displayed on the display area by way of a reflection area as a virtual image. The optical device has at least one reflector and an actuator, which is designed for moving the reflector. The display device is distinguished by the fact that the actuator includes a shape memory material, which is designed to be deformed by way of a temperature-dependent phase transition and thereby move the reflector.

The use of a shape memory material for the actuator advantageously makes it possible to move the reflector, such as for example a mirror, without an electric current. Since the shape memory material is designed to be deformed in dependence on a temperature, in particular the temperature of the shape memory material itself, while retaining its state of aggregation, a temperature-dependent movement of the reflector can be realized, and consequently protection of temperature-sensitive components of the display device can be provided in a particularly easy and effective way that manages without sensors, open-loop or closed-loop control and the like. The forming of such an actuator, and consequently of the display device, is consequently particularly inexpensive and efficient in terms of installation space.

On account of the way in which the actuator functions without an electric current, the display device is also particularly energy-efficient and moreover even functions in parked vehicles, in which the ignition is switched off. As a result, it is also possible to dispense with a control circuit that moves the movement of the reflector in dependence on a switched-on or switched-off ignition. Even in the event of a vehicle defect or for example a flat battery, that is to say when no voltage can be provided for the vehicle's electrical system, it is ensured that no damage to the display device can occur. A further advantage is also that, even with the vehicle parked and inactive, the actuator is only deformed if it is also required for temperature reasons. If for example the vehicle is parked in the shade or in a garage, the actuator, and consequently the reflector, remains in its operationally ready starting position. By contrast with display devices in which the reflector is in principle always brought into the protective position when the vehicle is parked, it is not necessary for the reflector first to move into its operating position when a user puts the vehicle into operation. The display device is consequently also more time-saving in its use and much more convenient for a user.

The shape memory material may in this case take the form for example of a shape memory alloy, such as for example nickel-titanium, nickel-titanium-copper, copper-zinc, copper-zinc-aluminum, copper-aluminum-nickel, iron-nickel-aluminum, iron-manganese-silicon or zinc-gold-copper. The shape memory material may be deformed in dependence on its own temperature within a certain temperature interval, i.e., when there are changes in temperature below a specific lower temperature, no phase-transition-induced deformation takes place and, as from temperatures above a specific upper temperature, there is likewise no longer a phase-transition-induced change in shape. Shape memory alloys are certain metals or metal alloys that can exist in two different crystal structures. While most metals always have the same crystal structure up to their melting point, shape memory alloys have, depending on the temperature, two different structures (phases). The shape transformation or change in shape is consequently based on the phase transition, i.e. the temperature-dependent lattice transformation, into one of these two crystal structures. Such a phase-transition-induced change in shape, such as for example an expansion, at the same time exceeds the non-phase-transition-induced thermal expansion of materials by orders of magnitude, i.e., by a factor of several powers of ten.

A change in shape may in this case be understood as meaning both changes in the geometry or the volume and/or expansion in one direction or multiple directions different from one another. There are consequently numerous possibilities for using the properties of the shape memory material for forming an actuator. The actuator may also be formed as a separate component, which is arranged or fastened on the reflector in a mechanically contacting manner. This allows more degrees of freedom and possibilities in the forming of the actuator itself. The reflector and the actuator may however also be formed in one piece, for example in that the reflector is applied as a reflective coating to an area of the actuator. This represents a variant that is particularly compact and efficient in terms of installation space.

In the case of an advantageous configuration, the optical device is designed to project an image displayed on the display area in at least one direction of projection onto the reflection area, in particular to direct the light of the displayed image onto the reflection area, when the reflector is in a first position, the actuator being designed to move the reflector out of the first position by a temperature-dependent deformation, in particular a phase-transition-induced deformation, in such a way that light impinging on the optical device opposite to the direction of projection is not incident on the display area. The display area may be provided for example by a display, in particular by a TFT display. By providing that light which impinges on the optical device opposite to the direction of projection, in particular sunlight, is not directed onto the display area as a result of the temperature-dependent movement of the reflector out of the first position, it is advantageously ensured that there is no damage to the display.

Furthermore, the actuator may be set up in such a way that, when the temperature goes above a first predefined limit temperature, it moves the reflector out of a first position, in particular by a predefined amount. The deflection of the actuator, and also the limit temperature, can in this case be determined by the forming of the actuator, the material or materials used, the size, the volume and the geometrical shaping. Furthermore, it is advantageous if the actuator has a good thermal bond to the reflector, so that changes in temperature of the reflector are transferred as quickly as possible to the actuator. In this way it can be ensured that, even in the event of very rapid changes in temperature, a movement of the reflector out of its first position takes place before any damage to the display area can occur.

Furthermore, the actuator may be set up in such a way that, when the temperature goes below a second predefined limit temperature, it moves the reflector into the first position. If the temperature goes below the limit temperature, the actuator resumes its original state in terms of shape or length and consequently moves the reflector back into its starting position.

In this case, the first limit temperature may be greater than the second limit temperature. The difference between the first limit temperature and the second limit temperature is in this case dictated by the hysteretic properties of the shape memory material and may at the same time likewise be determined or predefined by the forming of the actuator and the materials used. The structural transformation of the shape memory material is in this case independent of the rate of the change in temperature. In addition, to initiate the phase transformation, the parameters temperature and mechanical stress are equivalent, that is to say the transformation can be brought about or influenced not only thermally, but also by a mechanical stress. This property can likewise be advantageously used in the forming of the actuator, for example in that the actuator is formed such that the shape memory material is under a corresponding mechanical stress in order to predefine the desired limit temperature above which the actuator is deformed.

In the case of a further advantageous configuration, the reflector is mounted rotatably about an axis of rotation, the actuator being designed to rotate the reflector about the axis of rotation. In particular, the actuator is in this case designed to rotate the reflector by a predefined angle about the axis of rotation when the temperature goes above the first limit temperature. The movement of the reflector by the actuator may however also be realized in a translational form. These represent particularly easy and effective measures for moving the reflector and thereby changing the optical path.

The motor vehicle has a display device in one of the configurations described above. The advantages mentioned for the display device and its embodiments apply in the same way to the motor vehicle.

The display device may be arranged in the motor vehicle in such a way that the optical device is designed to project an image displayed on the display area by way of a windshield as the reflection area as a virtual image. The light of the displayed image that is cast or projected by the optical device onto the windshield is partly reflected by the windshield, whereby the virtual image is produced. In particular, the display device is formed as a head-up display. Especially for this application, in which the display device is in a very exposed position, the provision according to the invention of an actuator with a shape memory material for moving the reflector is particularly advantageous to allow temperature-sensitive components of the display device to be protected.

BRIEF DESCRIPTION OF THE DRAWINGS

These and other aspects and advantages, features and details will become more apparent and more readily appreciated from the following description of the exemplary embodiments, taken in conjunction with the accompanying drawings of which.

DETAILED DESCRIPTION OF THE PREFERRED EMBODIMENT

Figure 2:
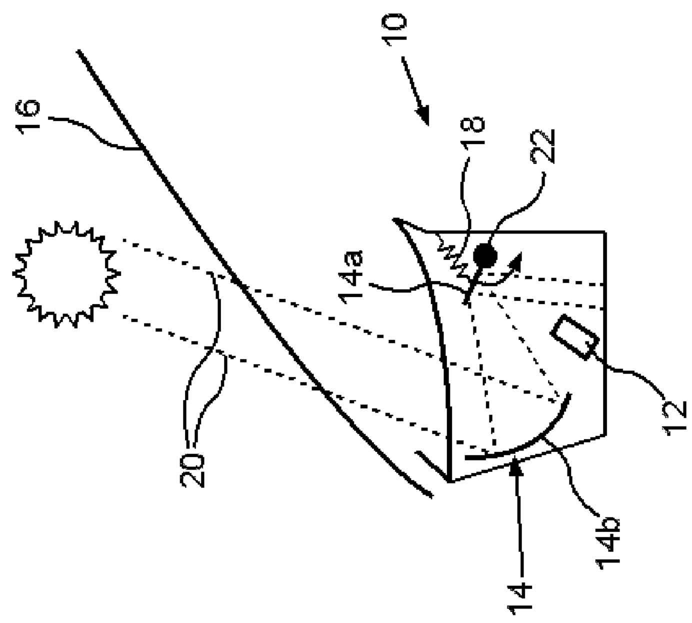
FIG. 2 shows a schematic representation of the display device according to FIG. 1 with the thermal shape memory actuator in its expanded position above the limit temperature according to an exemplary embodiment.

Reference will now be made in detail to the preferred embodiments, examples of which are illustrated in the accompanying drawings, wherein like reference numerals refer to like elements throughout.

Figure 1:
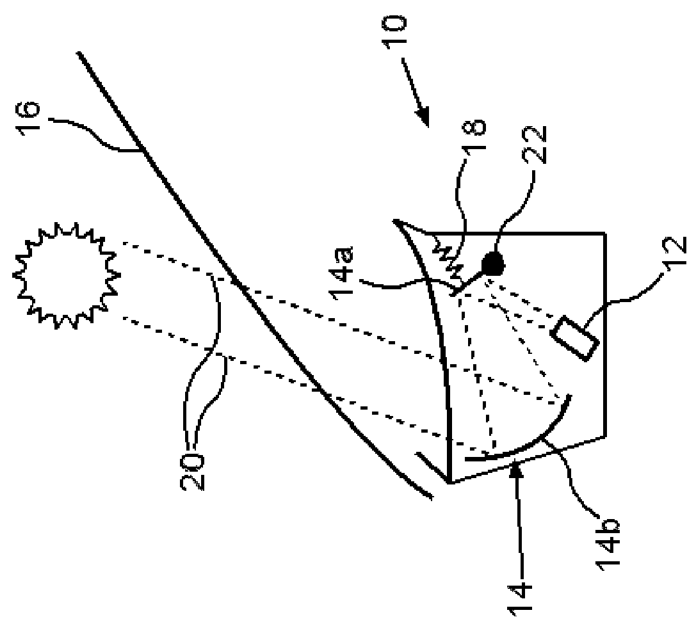
FIG. 1 is a schematic representation of a display device arranged in a motor vehicle with a thermal shape memory actuator in a starting position below a limit temperature for changing the optical path in the display device according to an exemplary embodiment.

FIG. 1 and FIG. 2 show a schematic representation of a display device 10 arranged in a motor vehicle with an imaging unit 12 and an optical device 14, which has an adjustable reflector **14*a*, according to an exemplary embodiment. The imaging unit 12 may in this case have a display with a display area, on which an image to be displayed is output. The image is then projected by way of the optical device 14 onto the windshield 16 of the motor vehicle, so that it is perceived by a user in the driver's seat as a virtual image. In this example, the optical device 14 has a first reflector 14*a* of a planar form and a second reflector 14*b* of a concave shape. These are arranged such that light emitted by the imaging unit 12 is directed via the first reflector 14*a* onto the second reflector 14*b* and from the latter onto a predetermined area of the windshield 16 that can optionally be set by way of the optical device 14, for example by way of the setting of the reflectors 14***a* and/or 14*b*. Conversely, sunlight 20 radiated in through the windshield 16 can consequently also be directed via the second reflector 14*b* onto the first reflector 14*a* and via the latter onto the imaging unit 12, in particular the display.

In order then to prevent damage to the display or else other temperature-sensitive components of the imaging unit 12, an alteration of the path of rays in dependence on certain temperature parameters is provided. For this purpose, one of the reflectors 14*a*, 14*b* or mirror elements, in this example the first reflector 14*a*, can be adjusted by an actuator 18 in such a way that the light 20 entering from outside no longer falls directly on temperature-sensitive components, such as for example the display, of the imaging unit 12. It is particularly advantageous here that this actuator 18 is formed as a thermal shape memory actuator 18 that functions without an electric current. On the basis of its principle, this actuator changes its shape/length when the temperature goes above a certain limit temperature, and can thus turn or pivot the first reflector 14*a* by a suitable kinematic mechanism. If the temperature goes below a limit temperature, it resumes its original state in terms of shape/length and consequently moves the first reflector 14*a* or the mirror into its starting position.

The actuator 18 in this case includes a shape memory material, such as for example a shape memory alloy, or is formed completely from a shape memory material which, in dependence on its own temperature, is deformed by a phase transition when the temperature goes above and below a limit temperature. In this example, the actuator 18 expands in the direction of its longitudinal extent when the temperature goes above a limit temperature as a result of the solar radiation 20 radiating in, as represented in FIG. 2, and thereby rotates the reflector 14*a* about the bearing point, or the bearing axis 22, at which the first reflector 14*a* is rotatably mounted, so that the sunlight 20 radiated onto the second reflector 14*b* is at least largely not directed via the first reflector 14*a* onto the display. If the temperature of the actuator 18 drops again and, as a consequence, goes below a certain second limit temperature, the actuator 18 resumes its original shape, and consequently the first reflector 14*a* resumes its starting position, as represented in FIG. 1. The second limit value may in this case lie below the first limit value, which is dictated by the hysteretic properties of shape memory alloys. Depending on the material used, the shaping, size, volume and forming of the actuator 18, the first and second limit values may be predefined and also coincide within a predefined limit. Furthermore, as a result the amount of the change in shape or the change in length, and consequently the angle by which the first reflector 14*a* is rotated, can also be predefined. For example, the actuator 18 may in this case be formed in the manner of a spring or spiral, whereby its change in shape during the phase transition can be converted particularly effectively into a change in length for the movement of the first reflector 14*a*.

As an alternative or in addition, the actuator 18 may also be provided for the movement of the second reflector 14*b*, in order to change the optical light path when the temperature goes above a limit temperature. Both reflectors 14*a* and 14*b* may also be coupled with a respective shape memory actuator 18. In addition, depending on the application, the display device 10 may also have just one reflector, which is moved by the actuator 18, or else more than two reflectors, then at least one of these reflectors being moved by the actuator 18. The reflectors may also be formed differently than in the way presented here in the surface geometry of their reflective surfaces, such as for example planar, concave, convex, and in their arrangement in relation to one another.

Altogether, the invention thus provides a display device which, by the provision of a thermal shape memory actuator that functions without an electric current, can prevent overheating of the display or other internal temperature-sensitive components of the display device in a way that is particularly inexpensive and efficient in terms of installation space. By forming the actuator in this way, it consequently undertakes the sensory and actuary elements of the previously known methods and it is possible to dispense with electronic sensing, evaluation and activation entirely. The way in which the actuator functions completely without requiring an electric current ensures the protection of the internal temperature-sensitive components at any time, even when the vehicle is parked, and altogether a particularly energy-saving, purely mechanical protective device is provided by the shape memory actuator.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A display device for a motor vehicle, the display device, comprising:

a display with a display area configured to display an image; and an optical device configured to project the image displayed on the display area, the optical device having at least one reflector, and an actuator, configured to move the at least one reflector, the actuator including a shape memory material responding to temperature change with a temperature-dependent phase transition and thereby moving the at least one reflector, the optical device configured to project the image from the at least one reflector onto the display area in at least one direction of projection when the at least one reflector is in a first position, the actuator configured to move the at least one reflector out of the first position so that light impinging on the optical device opposite to the direction of projection is not incident on the display area, the reflector being formed as a reflective coating on a reflection area of the actuator.

2. The display device as claimed in claim 1, wherein the actuator is configured to move the reflector, when the temperature goes above a first predefined limit temperature, out of the first position.

3. The display device as claimed in claim 2, wherein the actuator is configured to move the reflector, when the temperature goes below a second predefined limit temperature, into the first position.

4. The display device as claimed in claim 3, wherein the reflector is mounted rotatably about an axis of rotation, the actuator being configured to rotate the reflector about the axis of rotation.

5. The display device as claimed in claim 2, wherein the reflector is mounted rotatably about an axis of rotation, the actuator being configured to rotate the reflector about the axis of rotation.

6. The display device as claimed in claim 1, wherein the reflector is mounted rotatably about an axis of rotation, the actuator being configured to rotate the reflector about the axis of rotation.

7. The display device as claimed in claim 1, wherein the actuator is configured to move the reflector, when the temperature goes below a predefined limit temperature, into the first position.

8. A motor vehicle with a display device, comprising:

a display with a display area configured to display an image; and an optical device having at least one reflector configured to project the image displayed on the display area in at least one direction of projection when in a first position, and an actuator, including a shape memory material responding to temperature change with a temperature-dependent phase transition causing the at least one reflector to move out of the first position so that light impinging on the optical device opposite to the direction of projection is not incident on the display area, the reflector being formed as a reflective coating on a reflection area of the actuator.

9. The motor vehicle as claimed in claim 8, further comprising a windshield, and wherein the display device is arranged in the motor vehicle so that the optical device is configured to project the image displayed on the display area onto the windshield.

10. The motor vehicle as claimed in claim 8, wherein the actuator is configured to move the reflector, when the temperature goes above a first predefined limit temperature, out of the first position.

11. The motor vehicle as claimed in claim 10, wherein the actuator is configured to move the reflector, when the temperature goes below a second predefined limit temperature, into the first position.

12. The motor vehicle as claimed in claim 11, wherein the reflector is mounted rotatably about an axis of rotation, the actuator being configured to rotate the reflector about the axis of rotation.

13. The motor vehicle as claimed in claim 10, wherein the reflector is mounted rotatably about an axis of rotation, the actuator being configured to rotate the reflector about the axis of rotation.

14. The motor vehicle as claimed in claim 8, wherein the reflector is mounted rotatably about an axis of rotation, the actuator being configured to rotate the reflector about the axis of rotation.

15. The motor vehicle as claimed in claim 8, wherein the actuator is configured to move the reflector, when the temperature goes below a predefined limit temperature, into the first position.

* * * * *